Nov. 19, 1957  E. D. SPIDELL  2,814,034

SEQUENTIAL GAIN SELECTOR SYSTEM

Filed April 13, 1955

INVENTOR
EVERETT D. SPIDELL

BY
ATTORNEYS

United States Patent Office 2,814,034
Patented Nov. 19, 1957

2,814,034

SEQUENTIAL GAIN SELECTOR SYSTEM

Everett D. Spidell, Bayside, Va.

Application April 13, 1955, Serial No. 501,219

6 Claims. (Cl. 343—5)

(Granted under Title 35, U. S. Code (1952), sec. 266)

The invention described herein may be manufactured and used by or for the Government of the United States of America for governmental purposes without the payment of any royalties thereon or therefor.

The present invention relates to a sequential gain selector system and more particularly to a sequential gain selector system in which a plurality of voltages of predetermined magnitude are provided in a sequential fashion.

In radar scope photograph interpretation, the interpreter must be able to clearly identify all targets in a given area. With the old method of taking photographs at one radar receiver gain setting, close targets were poorly defined due to "bloom" while those farther away perhaps did not show up at all. It was found that this difficulty could be overcome, to a great extent, if several photographs were taken at different radar receiver gain levels; for, at the low gain levels many small targets would show up which were blanked out before by larger targets with the higher gain setting. While as few as three different gain settings gave suitable information, this necessitated three flights over the same area, once for each radar receiver gain setting. It soon become apparent that some mechanical device which would rapidly and alternately change the gain presentation of the radar would be of great assistance and at the same time would reduce by 67 percent the required amount of costly flying time.

The present invention comprises two junction boxes and a gain selector. If used in a radar photographic application, one junction box is connected to the triggering voltage source that triggers the change of frames in the camera and the junction box conducts this voltage to the gain selector where it is used to operate a stepping switch. In the gain selector, a potentiometer arrangement is provided for each desired radar receiver gain; the setting of each potentiometer arm determining the voltage tapped off by each potentiometer. For each position of the stepping switch only one potentiometer is placed across the gain selector output, and there is another switch for selecting the potentiometer that is connected to the output for any one position of the stepping switch. The gain selector output is joined by means of the other junction box to the radar receiver for controlling the receiver gain. Thus, the gain selector synchronizes the operation of the radar scope presentation with the camera and enables photographs at the different gains to be taken alternately. The advantage of utilizing junction boxes in a radar application is that thereby movement of the gain selector from one radar system to another can be accomplished without modification of the radar systems.

Accordingly, an object of the present invention is the provision of a system for producing a plurality of voltages of predetermined magnitude in a prearranged succession.

Another object is to provide a system for sequentially producing a plurality of voltages or predetermined magnitude in a predetermined order in synchronism with the variations of an input voltage.

A further object of the invention is the provision of a system which is adapted to be facilely moved from one application to another.

Still another object is to provide a gain selector system for a radar photographic unit having a radar receiver and camera for rapidly and alternately changing the gain presentation of the radar receiver in synchronism with the change of frames in the camera.

Other objects and many of the attendant advantages of this invention will be readily appreciated as the same becomes better understood by reference to the following detailed description when considered in connection with the accompanying drawings wherein.

Figure 1:
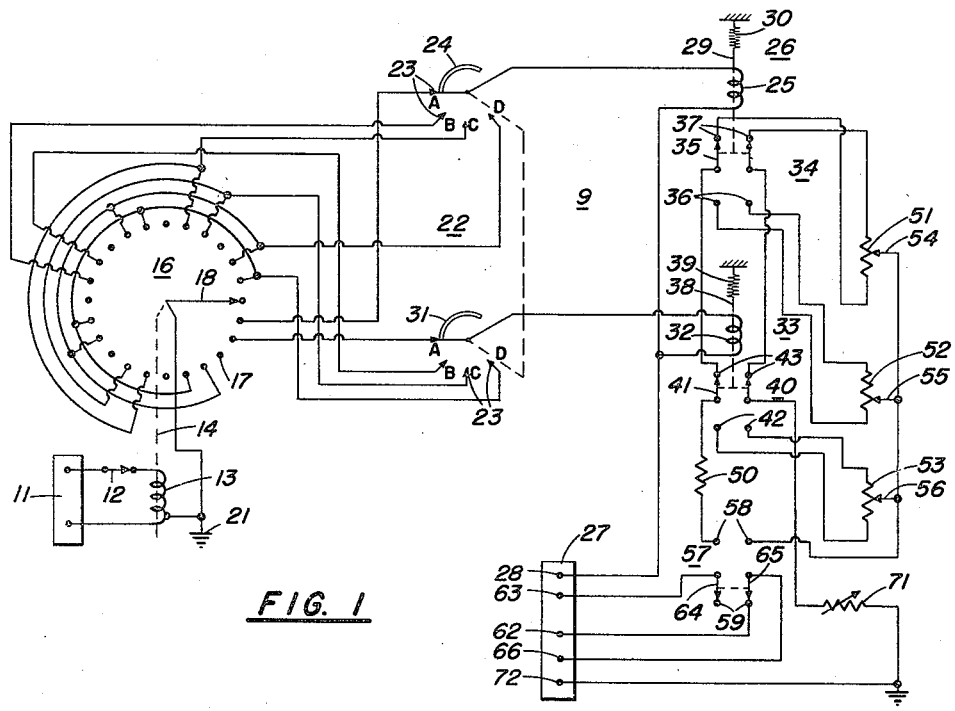
Fig. 1 shows a diagrammatic view of the gain selector system.

Referring now to the drawings, wherein like reference characters designate like or corresponding parts throughout the several views, there is shown in Fig. 1 (which illustrates preferred embodiment) a junction box 11 which is adapted to be connected to a source of varying voltage. This voltage is transmitted through single-pole-single-throw switch 12 and energizes coil 13 which by means of armature 14 causes the stepper-relay switch 16 to move through its positions. Each one of the contacts 17 corresponds to a position for switch arm 18. A common ground 21 is provided for arm 18 and one end of coil 13. A two wafer, four position switch 22 has contacts 23, each of which is connected to one or more contacts 17 of switch 16. Coil 25 of relay 26 joins wafer 24 to terminal 28 of junction box 27 and coil 32 of relay 33 joins wafer 31 to the same terminal 28. Armature 29 of relay 26 controls the position of switch arm 35 of double-pole-double-throw switch 34 such that upon energization of coil 25, armature 29 throws arm 35 over to contacts 36, while at other times armature 29 is so biassed by spring 30 to maintain arm 35 on contacts 37. In a similar manner armature 38 of relay 33 throws switch arm 41 of double-pole-double-throw switch 40 over to contacts 42 when coil 32 is energized, and when coil 32 is deenergized, arm 41 is maintained against contacts 43 as a result of the biassing action of spring 39. The positions of those double-pole-double-throw switches 34 and 40 determine which gain voltage is applied to the gain selector output. Potentiometer 51 is energized to provide an output when connected across switch arm 35, and the same is true of potentiometers 52, and 53 when connected, respectively, across switch arms 35 and 41. The movable arms 54, 55, and 56 of potentiometers 51, 52, and 53, respectively, are joined in series to one contact of the pair of contacts 58 of double-pole-double-throw switch 57. The other contact of the pair 58 is coupled through resistor 50 to one of the switch arms 41. Only one of the contacts of pair 59 has a connection and that is to terminal 62 of junction box 27. Terminals 63 and 66 of box 27 are joined, respectively, to switch arms 64 and 65 of switch 57. Variable resistor 71 couples grounded terminals 72 to one of the switch arms 41. While in this figure the invention is shown to have a stepping switch with twenty-four contacts, a wafer switch with four positions, two relays 25 and 32, and three potentiometers 51, 52, and 53, it should be apparent to one skilled in the art that, if desired, the number of these components can be changed.

Figure 2:
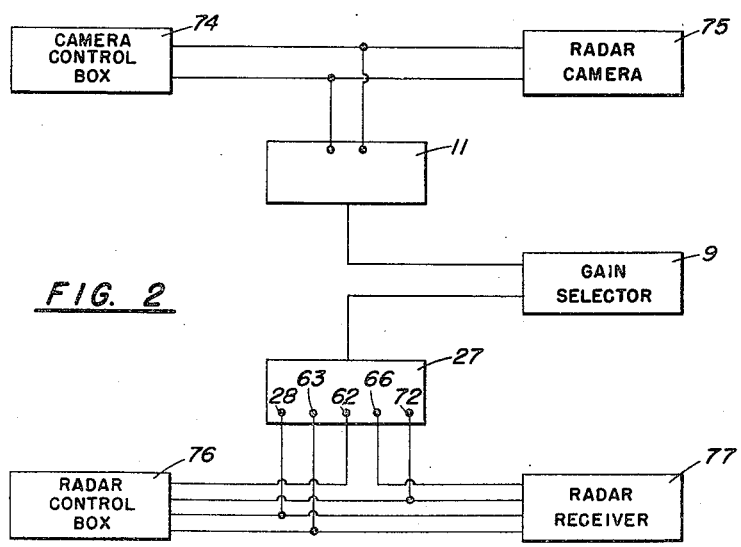
Fig. 2 illustrates a schematic view of the gain selector system of this invention as employed in a radar photographic unit.

In the radar photographic application of Fig. 2, camera control box 74 transmits a varying voltage which changes the film frame in radar camera 75. Camera junction box 11 joins the stepping switch coil of gain selector 9 in parallel with this voltage; thus, the stepping switch is operated in synchronism with the change of frames in camera 75. Radar control box 76 provides operating voltages including a gain control bias for radar receiver 77. Junction box 27 connects terminals 28, 63, and 72 across three voltages to obtain operating potentials for gain selector 9. The normal bias for the receiver gain control from radar control box 76 is connected to terminal 62 and terminal 66 is connected to the radar receiver gain control circuit.

To commence operation, junction box 27 is plugged into a unit which will give the proper operating voltages for gain selector 9. The voltage at terminal 28 must be sufficient to operate relays 26 and 33. The voltage at terminal 63 is the negative voltage which provides the energization for the potentiometers which tap off a portion for the selector output. Terminal 72 is grounded. When the gain selector is employed in a radar photographic application the normal bias voltage for the radar receiver is applied at terminal 62. The output from the gain selector is taken from terminal 66. Junction box 11 is then connected to a source of voltage for stepping switch 16. With the switch arms of switch 57 thrown over to contacts 59, there is no output connection from the gain selector 9 to junction box 27, and in the radar application the normal receiver bias which is connected to terminal 62 is transmitted to the receiver by terminal 66. To connect the selector output to terminal 66, the switch arms of switch 57 must be thrown to contacts 58. The potentiometer arms 54, 55, and 56 are then set for the desired output voltages. These arms may be calibrated in voltage units thus permitting presetting, or the potentiometers 51, 52, and 53 can be adjusted to the desired gain values while the selector 9 is in operation. Switch 22 is positioned to give the desired voltage sequence for every cycle of arm 18 of switch 16 as follows: in position A the output of potentiometers 52 and 53 occur once each, and that of potentiometer 51 twenty-two times; in position B the output of potentiometers 52 and 53 occur twice each and that of potentiometer 51 twenty times; in position C the output of potentiometers 52 and 53 occur four times each and that of potentiometer 51 sixteen times; and in position D the outputs of potentiometers 52, 53, and 51 occur eight times each. That these are the actual sequences is apparent once it is noted that the input at terminal 63 energizes potentiometer 51 when relays 26 and 33 are deenergized and thus the output at terminal 62 must then come from potentiometer arm 54. Similarly, when relay 25 is energized switch arms 35 are moved to connect potentiometer 52 to terminal 63 and to disconnect potentiometer 51. Also, upon energization of relay 33, switch arms 41 are moved to couple potentiometer 53 to terminal 63 and to disconnect potentiometers 51 and 52. Relays 26 and 33 are energized only when switch arm 18 produces a ground connection for them via switch 22. Hence, the number and placement of contacts 17 that are joined through wafers 24 and 31 to coils 25 and 32, respectively, determine the voltage sequential output of gain selector 9. Some exemplary circuit component values are:

Potentiometers 51, 52, and 53_____ 1,000 ohms, 2 watt.
Resistor 71_____ 1,200 ohms, 4 watt.
Voltages:
    Terminal 28_____ 27 volts.
    Terminal 63_____ −105 volts.
    Box 11_____ 27 volts.

When the selector system is used with a radar photographic as is shown in Fig. 2, the output of the gain selector occurs in synchronism with the change of frames in camera 75, and biases the gain control of the receiver 77 at different values as determined by the potentiometer settings of the gain selector 9.

A system has been disclosed for sequentially producing a plurality of voltages of predetermined magnitude in a prearranged order. While this system has general applicability, it is especially suited for automatically controlling the gain of a radar receiver in a radar-photographic unit in synchronism with the change of frames in the radar camera. In such use, this system can result in a flying time saving of 67 percent.

Obviously many modifications and variations of the present invention are possible in the light of the above teachings. It is therefore to be understood that within the scope of the appended claims the invention may be practiced otherwise than as specifically described.

What is claimed is:

1. A system comprising: a stepping switch having a plurality of first contacts and an arm which makes electrical connection with said first contacts, one at a time; a plurality of switches, each of which has a plurality of second contacts and an arm which makes electrical connection with said second contacts; leads for connecting each one of said second contacts to one or more of said first contacts but in a manner such that no first contact is connected to more than one second contact; a plurality of relays, each relay having a coil with two terminals; leads for connecting one of said terminals for each coil to one post of a source of first potential and for connecting the other terminal to an arm of one of said plurality of switches, such that each coil is connected to only one switch; leads for coupling the arm of said stepping switch to the other post of said first potential; a plurality of sources of different second potentials; a pair of output terminals; and means under the control of said plurality of relays for connecting one of said sources of second potential across said pair of output terminals when no relays are energized and for connecting a different second source across the output for every different relay that is energized.

2. A system comprising: a plurality of sources of different potentials; a pair of output terminals; a plurality of relays, one less than the number of said sources; switch means controlled by said relays for connecting one of said sources across said output terminals when no relays are energized and upon energization of any relay for disconnecting said one source and for connecting a different source across said output terminals for every different relay that is energized; and means for sequentially energizing said relays in a predetermined order one at a time.

3. The system of claim 2 wherein the means for sequentially energizing said relays comprises: a stepping switch having an arm for making electrical connection with a plurality of contacts, one at a time; means for stepping said stepping switch at a desired rate; and conducting leads for completing the energizing circuit of said relays through said stepping switch contacts and arm such that for any one position of said stepping switch arm no more than one of said relays is energized.

4. A system for sequentially providing a plurality of potentials of a predetermined magnitude in a predetermined order to control the gain of a radar receiver in a radar photographic unit having a radar camera, a camera control box, a radar receiver, and a radar control box, said system comprising: a stepping switch having an arm for making electrical connection with a plurality of first contacts; electrical means for stepping said stepping switch; a camera junction box coupled to said electrical means and for connection to place the electrical potential, emanating from the camera control box which produces the change in frames of the radar camera, across said electrical means whereby said arm of said stepping switch moves to different first contacts in synchronism with the change of frames in said radar camera; a plurality of switches, each of said switches having a plurality of second contacts and an arm which makes electrical connection with said second contact; conducting leads for conneciting each second contact to one or more of said first contacts in a manner such that no first contact is connected to more than one second contact; a plurality of relays, each of which has a coil with two terminals; conducting leads for connecting one terminal of each relay to one post of a source of first potential and the other terminal to an arm of one of said plurality of switches such that each coil is connected to one switch only; leads for connecting the arm of said stepping switch to the other post of said first potential; a plurality of sources of different potentials, one more than the number of said relays, each relay corresponding to a different potential source; a radar junction box connected for tapping off voltages from said radar control unit to provide said first potential and the energy for said different potentials; a pair of output terminals in said radar junction box for connection to the gain control in the radar receiver; and means under control of said plurality of relays for connecting one of said sources of potential across said pair of output terminals when no relays are energized and upon energization of any relay for disconnecting this source and for connecting the source corresponding to the energized relay across said output terminals.

5. A system comprising: an output terminal adapted to be energized by a source of voltage; a stepping switch having a plurality of output terminals for sequentially completing a circuit to said output terminals, one at a time, in a predetermined order; a plurality of relays each of which has first and second input terminals for producing a mechanical output upon being energized; means for connecting said output terminals of said stepping switch means to said first input terminal of each of said plurality of relays, whereby each of said relays can be connected to one or more of said output terminals in a selectable manner; a voltage source connected to said second input terminal of each of said relays; a plurality of potentiometers; an output terminal; leads for connecting a common element of each of said potentiometers to said output terminal; a plurality of electrical switches, each different switch connected to be operated by the mechanical action of a different relay; and leads for connecting said input terminal to said switches and said switches to said potentiometers whereby said input terminal is connected at any one time to only one of said potentiometers.

6. The system of claim 5 in combination with a radar photographic unit having a radar camera, a camera control box for transmitting a varying voltage which changes the film frame in said radar camera, a radar receiver, and a radar control box for producing a gain control voltage output for said radar receiver, said combination comprising: leads for connecting said varying voltage from said camera control box to said stepping switch means whereby the operation of said stepping switch means is in synchronism with the change of film frame in said radar camera, and leads for connecting said gain control voltage output to said input terminal and said output terminal to a gain control circuit of said radar receiver whereby the voltage on said output terminal controls the gain of said radar receiver.

References Cited in the file of this patent
UNITED STATES PATENTS
2,422,334   Bedford _____ June 17, 1947